No. 766,413. PATENTED AUG. 2, 1904.
A. D. BLOCH.
EYEGLASSES OR SPECTACLES.
APPLICATION FILED AUG. 6, 1903.
NO MODEL.
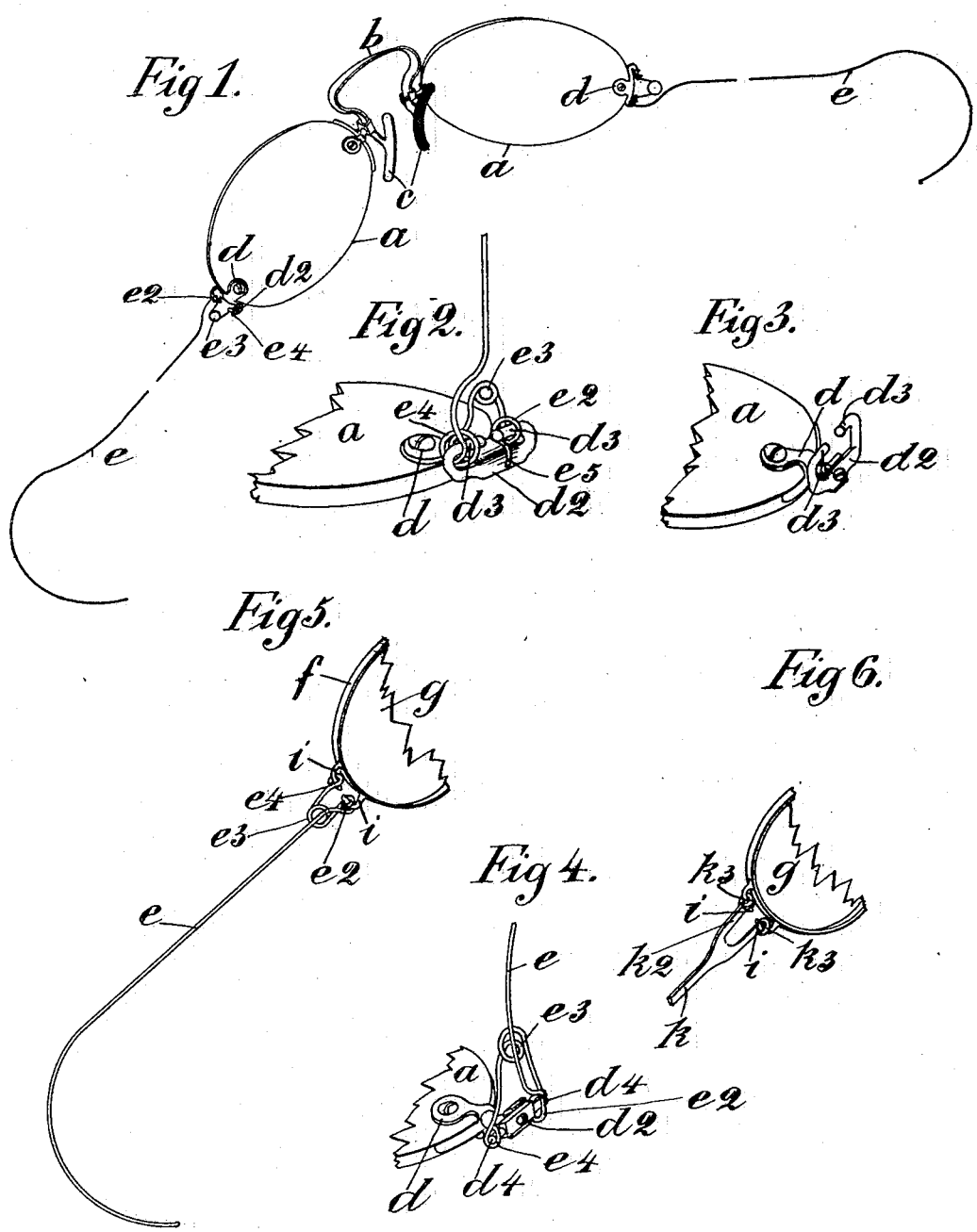
WITNESSES
F. A. Stewart
C. E. Mulreany
INVENTOR
Abel D. Bloch
BY Edgar Tate & Co
ATTORNEYS No. 766,413. Patented August 2, 1904.

UNITED STATES PATENT OFFICE.

ABEL D. BLOCH, OF ELIZABETH, NEW JERSEY.

EYEGLASSES OR SPECTACLES.

SPECIFICATION forming part of Letters Patent No. 766,413, dated August 2, 1904.

Application filed August 6, 1903. Serial No. 168,395. (No model.)

*To all whom it may concern:*

Be it known that I, ABEL D. BLOCH, a citizen of the United States, residing at Elizabeth, in the county of Union and State of New Jersey, have invented certain new and useful Improvements in Eyeglasses or Spectacles, of which the following is a specification, such as will enable those skilled in the art to which it appertains to make and use the same.

The object of this invention is to provide an improvement in eyeglasses and spectacles whereby a pair of spectacles may be easily converted into a pair of eyeglasses whenever desired and whereby a pair of eyeglasses may also be converted into a pair of spectacles whenever desired; and with these and other objects in view the invention consists in the construction, combination, and arrangement of the parts in connection with eyeglasses and spectacles hereinafter described and claimed.

The invention is fully disclosed in the following specification, of which the accompanying drawings form a part, in which the separate parts of my improvement are designated by suitable reference characters in each of the views, and in which—

Figure 1 is a perspective view of a pair of eyeglasses provided with my improvement; Fig. 2, a view of a part of Fig. 1 on a larger scale. Figs. 3 and 4 are views similar to Fig. 2, but showing modification. Figs. 5 and 6 are views showing a part of the frame of a pair of spectacles on an enlarged scale.

In the practice of my invention as shown in Figs. 1 and 2 I provide a pair of eyeglasses comprising the separate glasses $a$, connected by the usual nose-piece $b$, which is provided with the usual nose-clips $c$. The ends of the glasses $a$ opposite the spring $b$ are provided with clips $d$, having a transverse member or bar $d^2$, provided with inwardly-directed fingers $d^3$, and I also provide spring side arms or bows $e$, which are adapted to engage the ear in the usual manner and which are composed of spring-wire bent to form a ring or coil $e^2$, a central ring or coil $e^3$, and a supplemental ring or coil $e^4$, and in practice the spring rings or coils $e^2$ and $e^4$ are pressed together and inserted between the ends of the fingers $d^3$, after which they expand and engage said fingers, as clearly shown in Fig. 2. By means of this construction the said arms or bows $e$ may be attached to or detached from the eyeglasses whenever desired, and the said glasses may thus be used in the ordinary manner or as a pair of spectacles whenever necessary. One of the coils $e^2$ and $e^4$, preferably coil $e^2$, is provided with a backwardly-directed member or finger $e^5$, which presses on the cross-bar $d$ and prevents the arms or bows $e$ from swinging backwardly too far.

In the construction shown in Figs. 1 and 2 the cross-bar or member $d^2$ is formed integrally with the clip $d$, and this clip must therefore be made especially for this purpose; but in the construction shown in Fig. 3 I secure the cross-bar $d^2$ to the clip $d$ and the ordinary clip $d$ may be employed.

The construction shown in Fig. 4 is similar to that shown in Fig. 3 with the exception that the cross-bar $d^2$ is provided at its ends with extensions $d^4$, which take the place of the inwardly-directed fingers $d^3$, and in this form of construction the rings or coils $e^2$ and $e^4$ are pressed apart and allowed to engage the members $d^4$ when they contract; but the operation of the said arms or bows $e$ will be substantially the same with either of these forms of construction.

In Figs. 5 and 6 I have shown a part of the frame of a pair of spectacles comprising the usual frame members $f$, in which the glasses are placed, and in this form of construction the said frame members are provided at their outer ends with angular and inwardly-directed fingers $i$ and the arms or bows $e$ are connected with the fingers $i$ in the same manner as in the construction shown in Figs. 1 and 2, and this form of the improvement may be applied either to eyeglasses or spectacles, as may be desired. In the form of construction shown in Fig. 6, however, I employ the ordinary side bow or bar $k$, the attached end of which is slit longitudinally to form two spring members or fingers $k^2$, provided at their ends with eyes or rings $k^3$, which in practice are compressed, so as to pass through the fingers $i$, after which they are allowed to expand and engage said fingers or finger-pieces, or the spring members or fingers $k^2$ may be made to operate as shown in Fig. 4.

Having fully described my invention, what I claim as new, and desire to secure by Letters Patent, is—

1. A pair of eyeglasses the outer ends of which are provided with the usual clips having laterally-arranged fingers, and side arms or bows provided with laterally-arranged spring-catches adapted to engage said fingers, substantially as shown and described.

2. A pair of eyeglasses or spectacles, the outer ends of which are provided with laterally-arranged fingers, and side arms or bows provided with laterally-arranged spring-catches adapted to engage said fingers, substantially as shown and described.

In testimony that I claim the foregoing as my invention I have signed my name, in presence of the subscribing witnesses, this 4th day of August, 1903.

ABEL D. BLOCH.

Witnesses:
F. A. STEWART,
C. E. MULREANY.